(12) United States Patent
Ma et al.

(10) Patent No.: US 12,197,092 B2
(45) Date of Patent: Jan. 14, 2025

(54) LIGHT EMITTING SUBSTRATE, BACKLIGHT MODULE, AND DISPLAY DEVICE

(71) Applicants: Hefei BOE Ruisheng Technology Co., Ltd., Anhui (CN); BOE TECHNOLOGY GROUP CO., LTD., Beijing (CN)

(72) Inventors: Yajun Ma, Beijing (CN); Zhi Zhang, Beijing (CN); Li Yin, Beijing (CN); Zhenzhong Fang, Beijing (CN); Penghua Wang, Beijing (CN)

(73) Assignees: HEFEI BOE RUISHENG TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/017,268

(22) PCT Filed: Feb. 23, 2022

(86) PCT No.: PCT/CN2022/077474
§ 371 (c)(1),
(2) Date: Jan. 20, 2023

(87) PCT Pub. No.: WO2023/159393
PCT Pub. Date: Aug. 31, 2023

(65) Prior Publication Data
US 2024/0248357 A1    Jul. 25, 2024

(51) Int. Cl.
*G02F 1/1362* (2006.01)
*G02F 1/1335* (2006.01)

(52) U.S. Cl.
CPC .. *G02F 1/136286* (2013.01); *G02F 1/133612* (2021.01)

(58) Field of Classification Search
CPC ................ G02F 1/136286; G02F 1/133612
See application file for complete search history.

(56) References Cited

U.S. PATENT DOCUMENTS

2005/0184403 A1   8/2005  Inagawa
2008/0030645 A1*  2/2008  Nam ............... G02F 1/133608
                                          362/613

(Continued)

FOREIGN PATENT DOCUMENTS

CN    105806851 A    7/2016
CN    110764639 A    2/2020

(Continued)

*Primary Examiner* — Mariam Qureshi
(74) *Attorney, Agent, or Firm* — IP & T GROUP LLP

(57) ABSTRACT

A light emitting substrate is provided. The light emitting substrate includes a plurality of driver chip sets, a plurality of ground traces, and one or more connection lines. At least one driver chip set includes a plurality of driver chip subsets, at least one driver chip subset includes a plurality of driver chips that are cascaded, and driver chip subsets in a same driver chip set are cascaded. Driver chips in a same driver chip subset are electrically connected to a same ground trace, and different driver chip subsets are respectively connected to different ground traces. Ground traces respectively connected to the driver chip subsets in the same driver chip set are electrically connected by at least one connection line.

17 Claims, 7 Drawing Sheets

(56) References Cited

U.S. PATENT DOCUMENTS

| | | | |
|---|---|---|---|
| 2009/0207633 A1* | 8/2009 | Ye | G02F 1/1336 362/631 |
| 2020/0355971 A1* | 11/2020 | Gao | H10K 71/00 |
| 2021/0064103 A1 | 3/2021 | Zhang et al. | |

FOREIGN PATENT DOCUMENTS

| | | |
|---|---|---|
| CN | 111341273 A | 6/2020 |
| CN | 113870770 A | 12/2021 |

\* cited by examiner

LIGHT EMITTING SUBSTRATE, BACKLIGHT MODULE, AND DISPLAY DEVICE

CROSS-REFERENCE TO RELATED APPLICATION

This application is a national phase entry under 35 USC 371 of International Patent Application No. PCT/CN2022/077474, filed on Feb. 23, 2022, which is incorporated herein by reference in its entirety.

TECHNICAL FIELD

The present disclosure relates to the field of display technologies, and in particular, to a light emitting substrate, a backlight module, and a display device.

BACKGROUND

Mini light emitting diodes (Mini-LEDs) have a size of about 100 μm to 300 μm, and micro light emitting diodes (Micro-LEDs) have a size of about less than 100 μm. Due to their small size and high brightness, Mini-LEDs and Micro-LEDs, when applied to a backlight module, can make fine adjustments to the backlight, so as to realize high dynamic range (HDR) display, thereby winning more and more attention. Currently, elevating the reliability of a light emitting substrate employing Mini-LEDs or Micro-LEDs is an urgent problem that needs to be solved.

SUMMARY

In an aspect, a light emitting substrate is provided. The light emitting substrate includes a plurality of driver chip sets, a plurality of ground traces, and one or more connection lines. At least one driver chip set includes a plurality of driver chip subsets, at least one driver chip subset includes a plurality of driver chips that are cascaded, and driver chip subsets in a same driver chip set are cascaded. Driver chips in a same driver chip subset are electrically connected to a same ground trace, and different driver chip subsets are respectively connected to different ground traces. Ground traces respectively connected to the driver chip subsets in the same driver chip set are electrically connected by at least one connection line.

In some embodiments, the light emitting substrate further includes a plurality of first voltage signal lines. At least one first voltage signal line extends substantially in a first direction, and the plurality of first voltage signal lines and the plurality of ground traces are arranged alternately in a second direction. A first voltage signal line corresponds to a driver chip subset. The plurality of first voltage signal lines are made of a same material and disposed in a same layer as the plurality of ground traces. The first direction intersects the second direction. The light emitting substrate has a light emitting region and a fan-out region that are arranged side by side in the first direction, and the plurality of driver chip sets are located in the light emitting region. An end of a ground trace away from the fan-out region extends beyond an end of the first voltage signal line away from the fan-out region. The one or more connection lines include a first connection line located on a side of the first voltage signal line away from the fan-out region, and the first connection line is electrically connected to the end of the ground trace away from the fan-out region.

In some embodiments, the first connection line is made of a same material and disposed in a same layer as the plurality of ground traces, and the first connection line and the end of the first voltage signal line away from the fan-out region have a distance therebetween.

In some embodiments, the distance between the first connection line and the end of the first voltage signal line away from the fan-out region is greater than or equal to 200 μm.

In some embodiments, the light emitting substrate further includes a plurality of first voltage signal lines. At least one first voltage signal line extends substantially in a first direction, and the plurality of first voltage signal lines and the plurality of ground traces are arranged alternately in a second direction. A first voltage signal line corresponds to a driver chip subset. The first direction intersects the second direction. The light emitting substrate includes a substrate, a first trace layer, a first insulating layer and a second trace layer that are stacked in sequence. The plurality of ground traces and the plurality of first voltage signal lines are located in the first trace layer. The first insulating layer is provided with a first via hole therein. The one or more connection lines include a second connection line located in the second trace layer, an orthographic projection of the second connection line on the first insulating layer partially overlaps with an orthographic projection of the first voltage signal line on the first insulating layer. The second connection line is electrically connected to a ground trace through the first via hole.

In some embodiments, the light emitting substrate has a light emitting region and a fan-out region that are arranged side by side in the first direction, and the plurality of driver chip sets are located in the light emitting region. The ground trace includes a main body portion and connecting portions, the main body portion extends in the first direction, and the connecting portions each electrically connect the main body portion to a driver chip. The second connection line is electrically connected to a connecting portion through the first via hole, and a width of the connecting portion electrically connected to the second connection line is greater than a width of another connecting portion not electrically connected to the second connection line.

In some embodiments, the light emitting substrate has a light emitting region and a fan-out region that are arranged side by side in a first direction, and the plurality of driver chip sets are located in the light emitting region. The light emitting substrate includes a substrate, a first trace layer disposed on the substrate, and an insulating pattern disposed on a side of the first trace layer away from the substrate. The insulating pattern is provided with a second via hole therein. A ground trace includes a first lead-out section located in the fan-out region, and the first lead-out section is located in the first trace layer. The one or more connection lines include a third connection line located in the fan-out region, the third connection line is located on a side of the insulating pattern away from the substrate, and the third connection line is electrically connected to the first lead-out section through the second via hole.

In some embodiments, the third connection line is of a grid-like structure.

In some embodiments, the light emitting substrate further includes a first insulating layer disposed on the side of the first trace layer away from the substrate, and a second trace layer disposed on a side of the first insulating layer away from the substrate. The insulating pattern is located in the first insulating layer, and the third connection line is located in the second trace layer.

In some embodiments, the plurality of driver chips in the driver chip subset are arranged substantially in a first direction, the plurality of driver chip subsets in the driver chip set are arranged substantially in a second direction, and the plurality of driver chip sets are arranged substantially in the second direction. The first direction intersects the second direction. The plurality of ground traces extend substantially in the first direction, and the plurality of ground traces and all driver chip subsets are arranged alternately in the second direction, and the driver chips in the driver chip subset are electrically connected to an adjacent ground trace.

In some embodiments, in any two adjacent driver chip subsets in the same driver chip set, a last stage driver chip in one driver chip subset is electrically connected to a first stage driver chip in another driver chip subset.

In some embodiments, each driver chip includes a signal input pin, a signal output pin, a ground pin, and a power pin. The light emitting substrate further includes a plurality of groups of light emitting devices, a plurality of first voltage signal lines, a plurality of second voltage signal lines, a plurality of addressing signal lines, a plurality of address adapter lines, and a plurality of feedback signal lines. At least one group of light emitting devices includes a plurality of light emitting devices, and light emitting devices in a same group of light emitting devices are electrically connected to a signal output pin of a same driver chip. Groups of light-emitting devices electrically connected to the driver chips in the driver chip subset are electrically connected to a first voltage signal line. A second voltage signal line is electrically connected to power pins of the driver chips in the driver chip subset. An addressing signal line is electrically connected to a first stage driver chip of driver chips in a driver chip set. In two driver chips that are cascaded, a signal output pin of a former stage driver chip is electrically connected to a signal input pin of a latter stage driver chip through an addressing adapter line. A feedback signal line is electrically connected to a last stage driver chip of the driver chips in the driver chip set.

In some embodiments, the plurality of second voltage signal lines are made of a same material and disposed in a same layer as the plurality of ground traces.

In some embodiments, the light emitting substrate has a light emitting region and a fan-out region that are arranged side by side in a first direction; in the light emitting region, the plurality of addressing signal lines, the plurality of addressing adapter lines and the plurality of feedback signal lines are made of a same material and disposed in a same layer.

In some embodiments, the light emitting substrate further has a bonding region located on a side of the fan-out region away from the light emitting region; in the fan-out region and the bonding region, the plurality of addressing signal lines and the plurality of feedback signal lines are located in a same layer as the plurality of ground traces.

In some embodiments, the light emitting substrate comprises a substrate, a first trace layer, a first insulating layer and a second trace layer that are stacked in sequence. The plurality of addressing signal lines and the plurality of feedback signal lines are located in the second trace layer in the light emitting region, and are located in the first trace layer in the fan-out region and the bonding region.

In another aspect, a backlight module is provided. The backlight module includes the light emitting substrate as described in any of the above embodiments.

In yet another aspect, a display device is provided. The display device includes a display panel and the backlight module as described above, and the backlight module is disposed on a backlight surface of the display panel.

BRIEF DESCRIPTION OF THE DRAWINGS

In order to describe technical solutions in the present disclosure more clearly, the accompanying drawings to be used in the description of some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, but are not limitations on an actual size of a product, an actual process of a method and an actual timing of a signal involved in the embodiments of the present disclosure.

DETAILED DESCRIPTION

Figure 1:
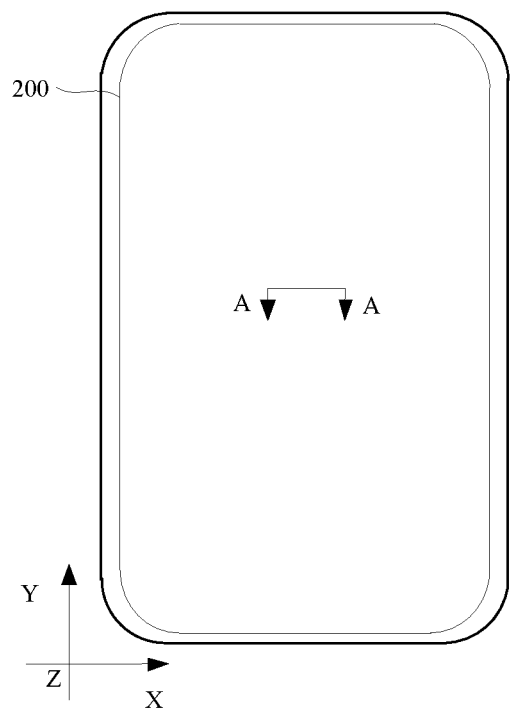
FIG. 1 is a structural diagram of a display device, in accordance with some embodiments.

The technical solutions in some embodiments of the present disclosure will be described clearly and completely with reference to the accompanying drawings. Obviously, the described embodiments are merely some but not all embodiments of the present disclosure. All other embodiments obtained on the basis of the embodiments of the present disclosure by a person of ordinary skill in the art shall be included in the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "included, but not limited to". In the description of the specification, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, terms such as "first" and "second" are only used for descriptive purposes, and are not to be construed as indicating or implying the relative importance or implicitly indicating the number of indicated technical features. Thus, features defined with "first" and "second" may explicitly or implicitly include one or more of the features. In the description of the embodiments of the present disclosure, the term "a plurality of" or "the plurality of" means two or more unless otherwise specified.

The phrase "A and/or B" includes the following three combinations: only A, only B, and a combination of A and B.

The phrase "applicable to" or "configured to" as used herein indicates an open and inclusive expression, which does not exclude devices that are applicable to or configured to perform additional tasks or steps.

In addition, the phrase "based on" as used herein is meant to be open and inclusive, since a process, step, calculation or other action that is "based on" one or more of the stated conditions or values may, in practice, be based on additional conditions or values exceeding those stated.

The term such as "about", "substantially" or "approximately" as used herein includes a stated value and an average value within an acceptable range of deviation of a particular value. The acceptable range of deviation is determined by a person of ordinary skill in the art in consideration of the measurement in question and errors associated with the measurement of a particular quantity (i.e., limitations of the measurement system).

The term "same layer" refers to a layer structure that is formed by forming a film layer for forming a specific pattern by a same film-forming process, and then patterning the film layer through a single patterning process by utilizing a same mask. Depending on different specific patterns, the patterning process may include several exposure, development and etching processes. The specific patterns in the formed layer structure may be continuous or discontinuous, and these specific patterns may also be at different heights or have different thicknesses.

The term such as "parallel", "perpendicular" or "equal" as used herein include a stated situation and a situation similar to the stated situation. A range of the similar situation is within an acceptable range of deviation. The acceptable range of deviation is determined by a person of ordinary skill in the art in consideration of the measurement in question and errors associated with the measurement of a particular quantity (i.e., limitations of the measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°; and the term "equal" includes absolute equality and approximate equality, and an acceptable range of deviation of the approximate equality may be, for example, that a difference between two equals is less than or equal to 5% of either of the two equals.

It will be understood that, when a layer or element is referred to as being on another layer or substrate, it may be that the layer or element is directly on the another layer or substrate, or it may be that intervening layer(s) exist between the layer or element and the another layer or substrate.

Exemplary embodiments are described herein with reference to sectional views and/or plan views as idealized exemplary drawings. In the accompanying drawings, thicknesses of layers and sizes of regions are enlarged for clarity. Thus, variations in shape with respect to the accompanying drawings due to, for example, manufacturing technologies and/or tolerances may be envisaged. Therefore, the exemplary embodiments should not be construed as being limited to the shapes of the regions shown herein, but as including deviations in the shapes due to, for example, manufacturing. For example, an etched region that is shown in a rectangular shape generally has a feature of being curved. Therefore, the regions shown in the accompanying drawings are schematic in nature, and their shapes are not intended to show actual shapes of regions in a device, and are not intended to limit the scope of the exemplary embodiments.

Some embodiments of the present disclosure provide a display device 1000. As shown in FIG. 1, the display device 1000 may be any device that displays an image, whether in motion (e.g., a video) or stationary (e.g., a still image), and whether textual or pictorial. For example, the display device 1000 may be a television, a laptop computer, a tablet computer, a cell phone, a personal digital assistant (PDA), a navigator, a wearable device, an augmented reality (AR) device, a virtual reality (VR) device, or any other product or component having a display function.

Figure 2:
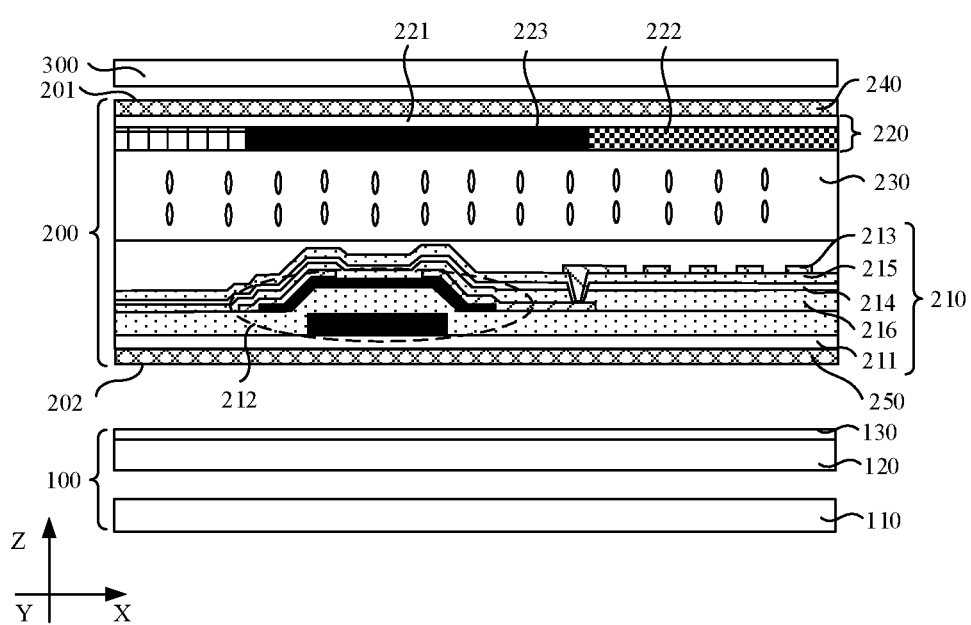
FIG. 2 is a cross-sectional view taken along a section line A-A in FIG. 1.

In some embodiments, the display device 1000 is a liquid crystal display (LCD). Referring to FIG. 2, the display device may include a backlight module 100, a display panel 200, and a glass cover plate 300. The display panel 200 includes a light exit surface 201 and a backlight surface 202. The light exit surface refers to a surface of the display panel 200 for displaying a picture (an upper side of the display panel 200 in FIG. 2), and the backlight surface refers to another surface opposite to the light exit surface. The backlight module 100 is disposed on the backlight surface of the display panel 200 (a lower side of the display panel 200 in FIG. 2), and the backlight module 100 is used for providing a light source for the display panel 200.

In some embodiments, referring to FIG. 2, the display panel 200 includes an array substrate 210, a counter substrate 220, and a liquid crystal layer 230 disposed between the array substrate 210 and the counter substrate 220.

Each sub-pixel of the array substrate 210 is provided with a thin film transistor (TFT) 212 and a pixel electrode 213 that are located on the first substrate 211. The thin film transistor 212 includes an active layer, a source, a drain, a gate, and a gate insulating layer. The source and the drain are each in contact with the active layer, and the pixel electrode 213 is electrically connected to the drain of the thin film transistor 212.

In some embodiments, as shown in FIG. 2, the array substrate 210 further includes a common electrode 214 disposed on the first substrate 211. The pixel electrode 213 and the common electrode 214 may be disposed in different layers, in which case, as shown in FIG. 2, a first insulating layer 215 is provided between the pixel electrode 213 and the common electrode 214. In a case where the common electrode 214 is disposed between the thin film transistor 212 and the pixel electrode 213, as shown in FIG. 2, a second insulating layer 216 is further provided between the common electrode 214 and the thin film transistor 212.

The pixel electrode 213 and the common electrode 214 may also be disposed in the same layer (not shown in the figures), in which case the pixel electrode 213 and the common electrode 214 are each of a comb structure including a plurality of stripe-shaped sub-electrodes. In some other embodiments, the common electrode 214 may be disposed in the counter substrate 220.

As shown in FIG. 2, the counter substrate 220 may include a color filter layer 222 disposed on a second substrate 221, in which case the counter substrate 220 may also be referred to as a color filter (CF) substrate. The color filter layer 222 includes at least red photoresist units, green photoresist units, and blue photoresist units. The red photoresist units, the green photoresist units, and the blue photoresist units are in one-to-one correspondence with and directly opposite to the sub-pixels of the array substrate 210. The counter substrate 220 further includes a black matrix pattern 223 disposed on the second substrate 221. The black matrix pattern 223 is used for spacing red photoresist unit, the green photoresist unit and the blue photoresist unit apart.

As shown in FIG. 2, the display panel (e.g., the liquid crystal display panel) 200 may further include a first polarizer 240 disposed on a side of the counter substrate 220 away from the liquid crystal layer 230, and a second polarizer 250 disposed on a side of the array substrate 210 away from the liquid crystal layer 230.

In some embodiments, the backlight module 100 includes a light emitting substrate 110. The light emitting substrate 110 may directly emit white light, which is directed to the display panel 200 after a light uniformizing treatment. Alternatively, the light emitting substrate 110 may emit light of another color, which is directed to the display panel 200 after color conversion and the light uniformizing treatment.

For example, referring to FIG. 2, the light emitting substrate 110 emits blue light, which is directed to the display panel 200 after the color conversion and the light uniformizing treatment. In this case, the backlight module 100 includes the light emitting substrate 110, a quantum dot film 120 and an optical film 130. The light emitting substrate 110 may emit blue light. The quantum dot film 120 may include a red quantum dot material, a green quantum dot material, and a transparent material. The blue light emitted by the light emitting substrate 110 is converted into red light when passing through the red quantum dot material, is converted into green light when passing through the green quantum dot material, and does not convert color when passing through the transparent material. Then, the blue light, the red light and the green light are mixed and superimposed in a certain proportion to present white light. The optical film 130 may include a diffuser plate and/or an optical brightness enhancement film, which is not limited in the embodiments of the present disclosure. The diffusion plate has a scattering and diffusion effect, and is capable of further mixing the above-mentioned white light uniformly; and the optical brightness enhancement film is capable of improving the light extraction efficiency of the backlight module 100.

Figure 3:
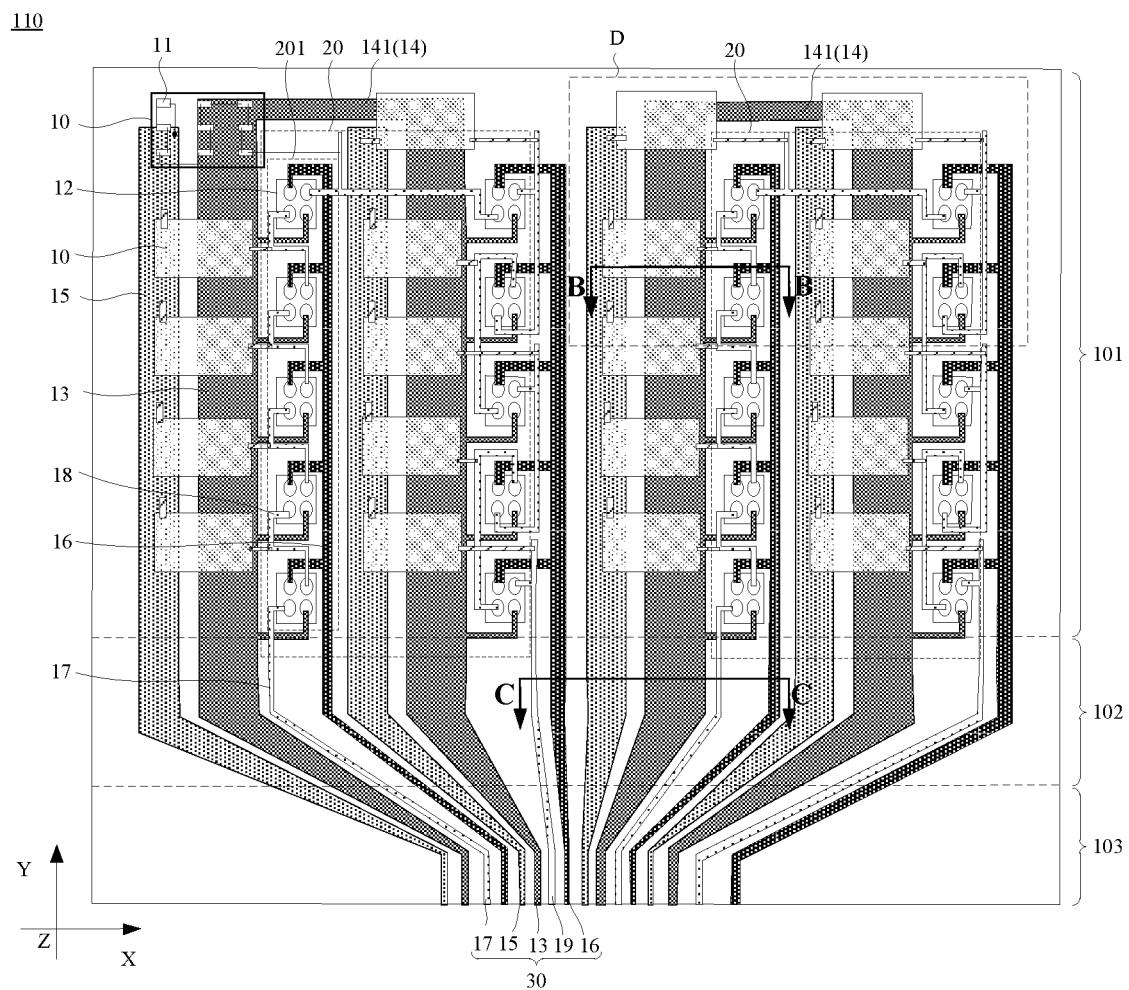
FIG. 3 is a structural diagram of a light emitting substrate, in accordance with some embodiments.

In some embodiments, referring to FIG. 3, the light emitting substrate 110 includes a plurality of groups of light emitting devices 10, a plurality of driver chip sets 20, and a plurality of signal lines 30. In FIG. 3, only two driver chip sets 20 are illustrated as an example.

At least one group of light emitting devices 10 includes a plurality of light emitting devices 11. For example, the light emitting device 11 may be a Mini-LED and/or a Micro-LED. A group of light emitting devices 10 may include 4, 6, 8, or 9 light emitting devices 11. The plurality of light emitting devices 11 may be connected in series and/or in parallel. For example, the plurality of light emitting devices 11 may be connected in series in sequence (as shown in FIG. 3); alternatively, some of the plurality of light emitting devices 11 are connected in series, and some are connected in parallel (not shown in the figures); alternatively, the plurality of light emitting devices 11 are connected in parallel (not shown in the figures).

The embodiments of the present disclosure do not limit the number of the light emitting devices 11 in a group of light emitting devices 10 and the connection manner of the light emitting devices in the group of light emitting devices 10. Accordingly, it will be understood that in FIG. 3, only the plurality of light emitting devices 11 of one group of light emitting devices 10 are shown as an example, and the remaining groups of light emitting devices 10 are each shown as a block for simplicity. Moreover, in FIG. 3, the group of light emitting devices 10 includes nine light emitting devices 11, and the nine light emitting devices 11 are connected in series, which is merely an example and does not constitute a limitation of the present disclosure.

At least one driver chip set 20 includes a plurality of driver chip subsets 201, at least one driver chip subset 201 includes a plurality of driver chips 12 that are cascaded, and driver chip subsets 201 in the same driver chip set 20 are cascaded. That is, all the driver chips 12 included in the driver chip subsets 201 in the driver chip set 20 are sequentially cascaded.

For example, referring to FIG. 3, a driver chip subset 201 includes a plurality of driver chips 12 arranged in a first direction Y, and a driver chip set 20 includes two driver chip subsets 201 distributed in a second direction X.

Figure 4A:
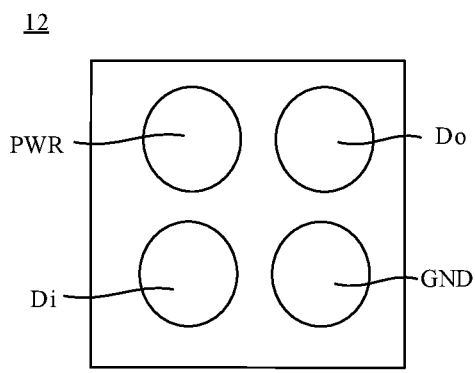
FIG. 4A is a structural diagram of a driver chip, in accordance with some embodiments.
Figure 4B:
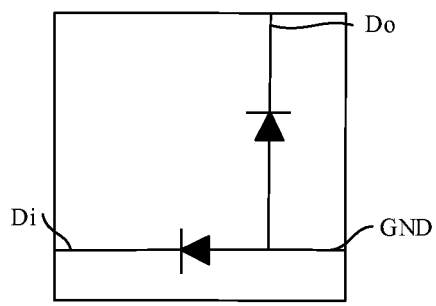
FIG. 4B is a structural diagram of an internal circuit of a driver chip, in accordance with some embodiments.

In some embodiments, referring to FIGS. 4A and 4B, the driver chip 12 may include a signal input pin Di (an input pin of an addressing signal ADDR), a signal output pin Do, a ground pin GND, and a power pin PWR. The description that the plurality of driver chips 12 are cascaded means that the plurality of driver chips 12 are sequentially cascaded, and in two driver chips 12 that are cascaded, the output pin Do of the former driver chip is electrically connected to the signal input pin Di of the latter driver chip.

The internal circuit of the driver chip 12 shown in FIG. 4B is merely exemplary, rather than the actual circuit inside the driver chip 12. The circuit is only used to indicate that the static electricity may be transferred from the ground pin GND of the driver chip 12 to the signal input pin Di and the signal output pin Do thereof, but cannot be transferred from the signal input pin Di and the signal output pin Do of the driver chip 12 to the ground pin GND thereof. In this way, in a case where there is a positive potential difference between the signal input pin Di of the driver chip 12 and the ground pin GND thereof and between the signal output pin Do of the driver chip 12 and the ground pin GND thereof (i.e., the potentials of the signal input pin Di and the signal output pin Do are both greater than the potential of the ground pin GND), the driver chip 12 may be broken down (damaged).

The plurality of signal lines 30 include a plurality of ground traces 13. The ground trace 13 is used to be electrically connected to the ground pin GND of the driver chip 12.

In the related art, a plurality of driver chips 12 in each driver chip subset 201 are electrically connected to a single ground trace 13, and different driver chip subsets are respectively connected to different ground traces 13 and are electrically insulated from each other. When static electricity is generated on a ground trace 13, the static electricity may be transferred to ground pins GND of the plurality of driver chips 12 electrically connected to the ground trace 13. For example, referring to FIG. 5, the driver chip subset 201 in which the plurality of driver chips 12 are located is referred to as a first driver chip subset 201A, and the driver chip subset 201 cascaded with the first driver chip subset 201A is referred to as a second driver chip subset 201B.

The static electricity may be transferred to a pin of the driver chip 12 (hereinafter: the target driver chip 12A), in the second driver chip subset 201B, that is cascaded with the first driver chip subset 201A (for example, the static electricity may be transferred from the signal output pin Do of the last stage driver chip 12 in the first driver chip subset 201A to the signal input pin Di of the first stage driver chip 12 in the second driver chip subset 201B). This, in turn, results in a potential difference between the pin of the target driver chip 12A cascaded with the driver chip 12 in the first driver chip subset 201A and the ground trace 13 (the ground trace 13 electrically connected to the target driver chip 12A). Due to action of the potential difference, the target driver chip 12A may be broken down, which may cause a group of light emitting devices 10 electrically connected to the target driver chip 12A to emit light abnormally.

Figure 5:
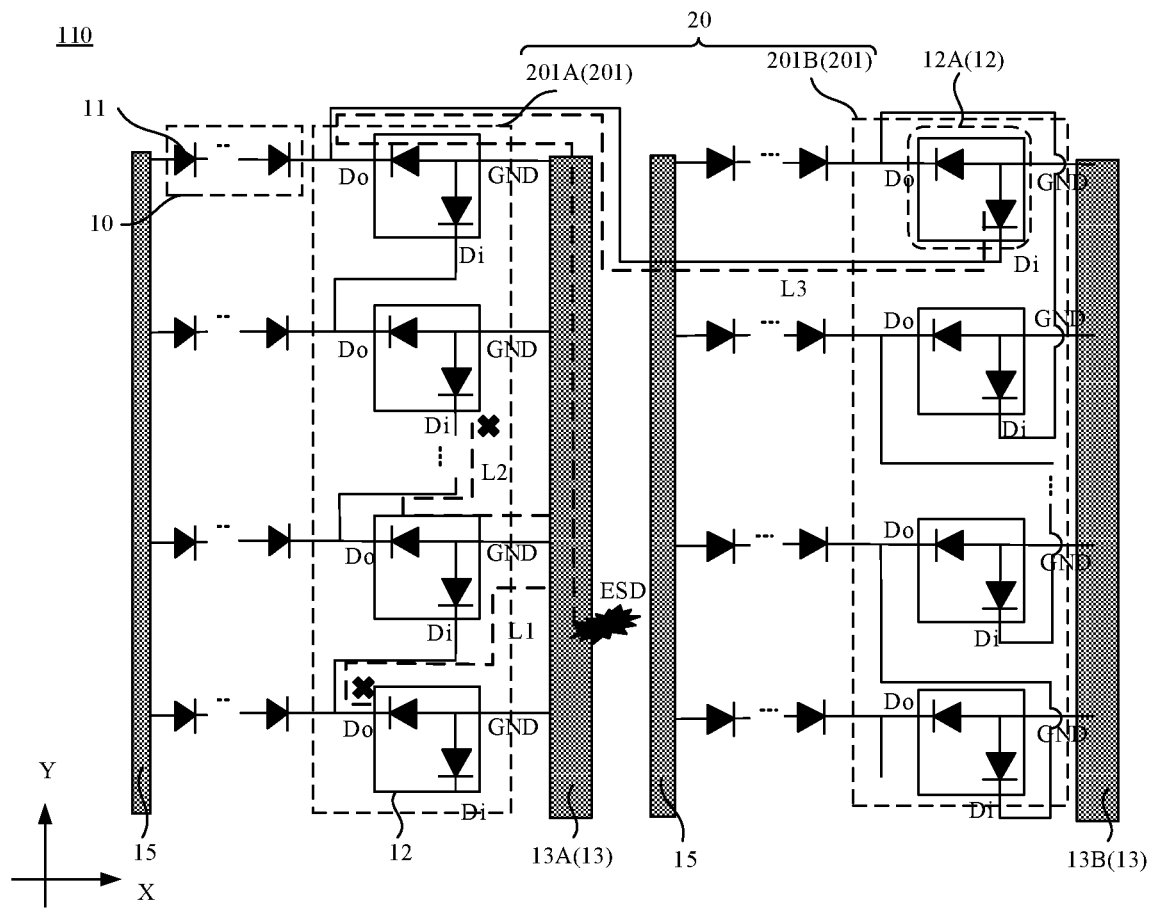
FIG. 5 is a diagram illustrating a wiring structure of a light emitting substrate in the related art.

For example, referring to FIG. 5, a driver chip set 20 includes two driver chip subsets 201 distributed in a second direction X. Herein, the two driver chip subsets 201 are the first driver chip subset 201A and the second driver chip subset 201B. The first driver chip subset 201A is electrically connected to a first ground trace 13A, the second driver chip subset 201B is electrically connected to a second ground trace 13B, and the first ground trace 13A is electrically insulated from the second ground trace 13B. When static electricity is generated on a ground trace 13 (e.g., the first ground trace 13A), the static electricity may enter the driver chip 12 through the ground pin GND of the driver chip 12, and may be transferred to the signal output pin Do of a previous driver chip 12 and the signal input pin Di of a next driver chip 12 respectively along the path L1 and path L2 and transferred from the last stage driver chip 12 (the uppermost driver chip 12 in FIG. 5) in the first driver chip subset 201A to the signal input pin Di of the first stage driver chip 12 (the target driver chip 12A) in the second driver chip subset 201B along the path L3. There is the potential difference between the signal input pin Di of the target driver chip 12A and the second ground trace 13B, and the potential difference may break down the first stage driver chip 12 in the second driver chip subset 201B, which may cause a group of light emitting devices 10 electrically connected to the first stage driver chip 12 to emit light abnormally.

Conversely, when static electricity is generated on the second ground trace 13B, there may be a potential difference between the driver chip 12, cascaded with the second driver chip subset 201B, in the first driver chip subset 201A (the uppermost driver chip 12 in the first driver chip subset 201A in FIG. 5) and the first ground trace 13A, and the potential difference may break down the driver chip 12, in the first driver chip subset 201A, that is cascaded with the second driver chip subset 201B.

Figure 6:
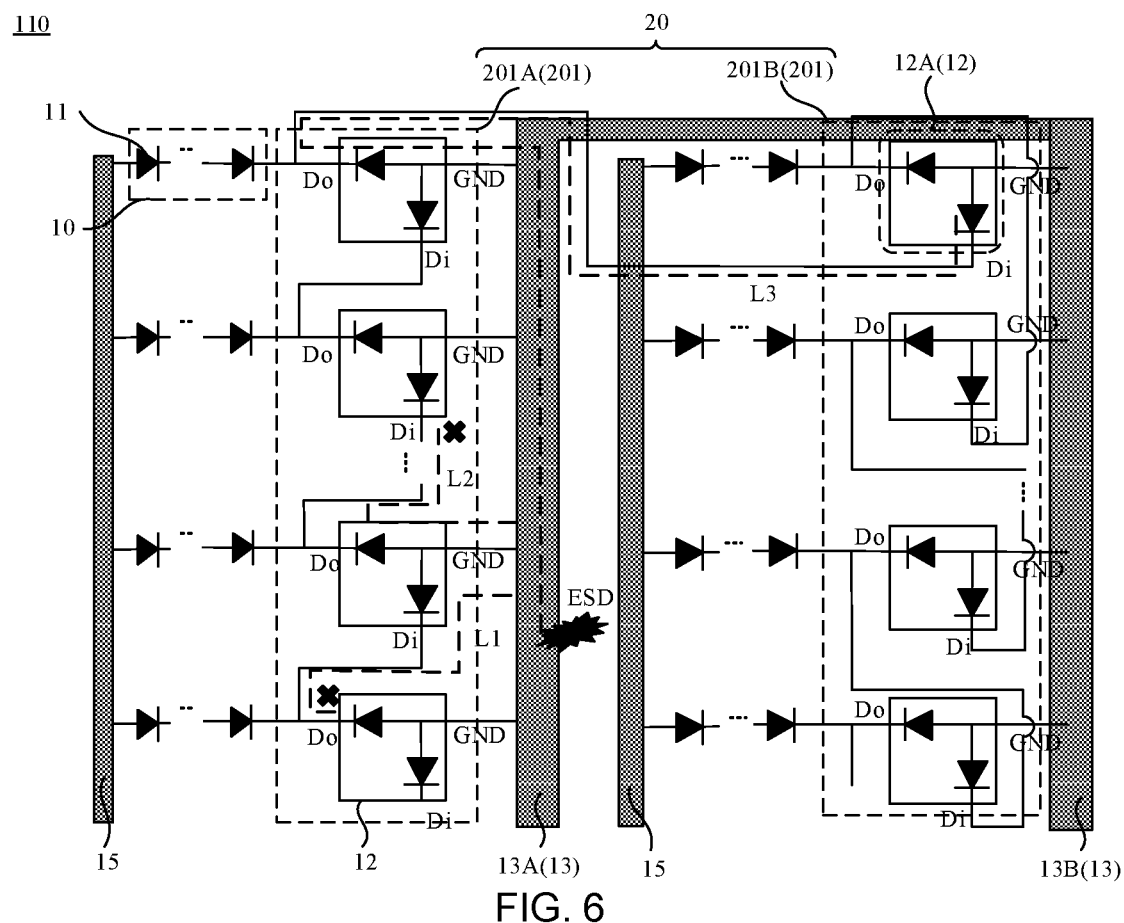
FIG. 6 is a diagram illustrating a wiring structure of a light emitting substrate, in accordance with some embodiments.

In order to solve the above problems, some embodiments of the present disclosure provide a light emitting substrate 110. Referring to FIGS. 3 and 6, the light emitting substrate 110 includes a plurality of driver chip sets 20, a plurality of ground traces 13, and one or more connection lines 14.

At least one driver chip set 20 of the plurality of driver chip sets 20 includes a plurality of driver chip subsets 201, at least one driver chip subset 201 includes a plurality of driver chips 12 that are cascaded, and a plurality of driver chip subsets 201 in the same driver chip set 20 are cascaded. That is, all the driver chips 12 included in the driver chip subsets 201 in the driver chip set 20 are cascaded. A plurality of driver chips 12 in the same driver chip subset 201 are electrically connected to the same ground trace 13, and different driver chip subsets 201 are respectively connected to different ground traces 13.

For example, referring to FIG. 3, only two driver chip sets 20 are shown in FIG. 3. Each driver chip set 20 of the two driver chip sets 20 includes two driver chip subsets 201. Each driver chip subset 201 includes a plurality of driver chips 12 that are cascaded. All the driver chips 12 included in the two driver chip subsets 201 are cascaded.

Ground traces 13 respectively connected to the plurality of driver chip subsets 201 in the same driver chip set 20 are electrically connected by at least one connection line 14. Based on this, after static electricity is generated on one of the ground traces 13, the static electricity may be transferred to a driver chip 12 electrically connected to the ground trace 13, and then, through the driver chip 12, be transferred to a pin of a driver chip 12 cascaded to the aforementioned driver chip 12. Thus, the driver chip 12 electrically connected to the ground trace 13, and the pin of the driver chip 12 cascaded to the driver chip 12 form an equipotential body.

The plurality of driver chips 12 in the same driver chip subset 201 are cascaded, and the plurality of driver chip subsets 201 in the same driver chip set 20 are cascaded. That is, all the driver chips 12 included in the same driver chip set 20 are cascaded. The ground traces 13 respectively connected to the plurality of driver chip subsets 201 in the same driver chip set 20 are electrically connected by the at least one connection line 14, that is, the ground traces 14 electrically connected to driver chips 12 that are cascaded with each other are electrically connected. As such, the ground traces 13 respectively electrically connected to the plurality of driver chip subsets 201 in the same driver chip set 20, and all the driver chips 12 in the same driver chip set 20 form an equipotential body. In this way, it may be possible to reduce the risk of forming a voltage difference between the driver chip 12 and the ground trace 13 electrically connected thereto, reduce the risk of the driver chip 12 being broken down, and improve the reliability of the light emitting substrate 110.

For example, referring to FIG. 6, FIG. 6 is an equivalent circuit diagram of the light emitting substrate 110 shown in FIG. 3. The driver chip set 20 includes two driver chip subsets 201 distributed in the second direction X. The two driver chip subsets 201 are the first driver chip subset 201A and the second driver chip subset 201B. The first driver chip subset 201A is electrically connected to the first ground trace 13A, the second driver chip subset 201B is electrically connected to the second ground trace 13B, and the first ground trace 13A and the second ground trace 13B are electrically connected by at least one connection line 14.

When static electricity is generated on one of the ground traces 13 (e.g., the first ground trace 13A), the static charge may be transferred to the second ground trace 13B, so that the first ground trace 13A and the second ground trace 13B form an equipotential body. Then, the static electricity enters the driver chips 12 through the ground pins GND of the driver chips 12 in the driver chip set 20, and passes through the driver chips 12 to be transferred to the signal input pins Di and the signal output pins Do of the driver chips 12. In this way, there is no potential difference between the ground pin GND and both the signal input pin Di and the signal output pin Do of the driver chip 12, which may reduce the risk of the driver chip 12 being broken down and improve the reliability of the light emitting substrate 110.

In some embodiments, referring to FIG. 3, the light emitting substrate 110 includes a light emitting region 101, a fan-out region 102 and a bonding region 103 that are arranged side by side in the first direction Y.

The plurality of groups of light emitting devices 10 and the plurality of driver chip sets 20 are disposed within the light emitting region 101. The fan-out region 102 is used to lead out the plurality of signal lines 30 to the bonding region 103, which is provided with a plurality of bonding pins for achieving electrical connection with other electronic components (e.g., a flexible printed circuit (FPC), a printed circuit board (PCB) and a control chip).

The plurality of driver chips 12 in the driver chip subset 201 are arranged substantially in the first direction Y, the plurality of driver chip subsets 201 in the driver chip set 20 are arranged substantially in the second direction X, and the plurality of groups of driver chips 20 are arranged substantially in the second direction X. That is, all the driver chips 12 included in the light emitting substrate 110 are arranged in columns in the first direction Y, and a plurality of columns of driver chips 12 are distributed in the second direction X; the plurality of driver chips 12 in each column are cascaded to form a driver chip subset 201, and the plurality of columns of driver chips (the plurality of driver chip subsets 201) are cascaded to form a driver chip set 20.

The first direction Y intersects the second direction X. For example, the first direction Y and the second direction X are perpendicular to each other.

It will be understood that the driver chips 12 included in the light emitting substrate 110 may also be arranged in other manners. The embodiments of the present disclosure are only described by considering an example where the driver chips 12 are arranged in a matrix.

The ground traces 13 extend generally in the first direction Y. For example, in the light emitting region 101, the ground trace 13 extends substantially in the first direction Y; and in the fan-out region 102, the ground trace 13 may be at an angle with the first direction Y.

In the second direction X, the ground traces 13 and the driver chip subsets 201 are alternately arranged. In this way, it may be conducive to the arrangement of the ground traces 13 and the electrical connection between the ground trace 13 and the plurality of driver chips 12 in the driver chip subset 201 in a case where the plurality of driver chips 12 in the driver chip subset 201 are electrically connected to the ground trace 13.

In some embodiments, the plurality of driver chips 12 in the driver chip subset 201 are electrically connected to an adjacent ground trace 13. For example, referring to FIG. 3, the plurality of driver chips 12 in the driver chip subset 201 are electrically connected to a ground trace 13 on the left side thereof.

Figure 7:
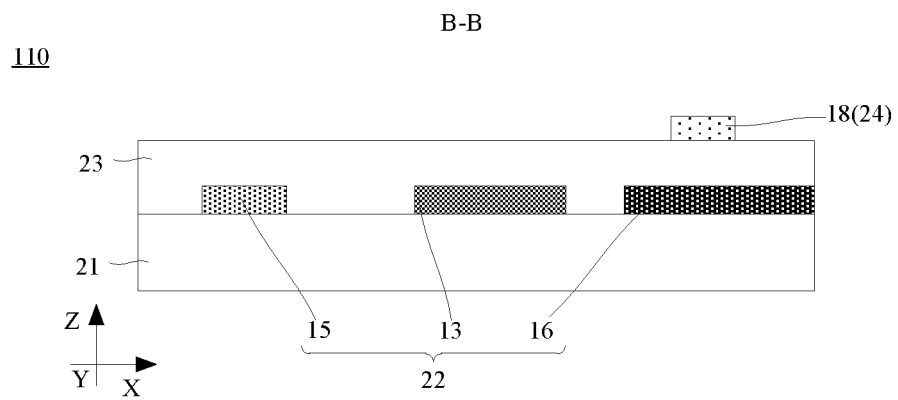
FIG. 7 is a cross-sectional view taken along a section line B-B in FIG. 3.
Figure 8:
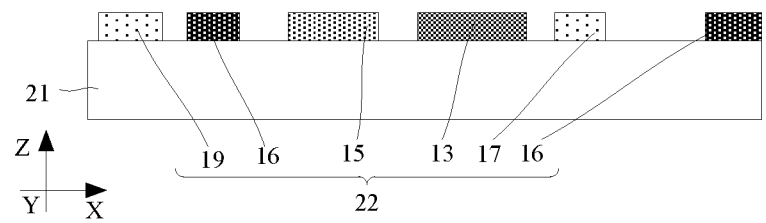
FIG. 8 is a cross-sectional view taken along a section line C-C in FIG. 3.

In some embodiments, reference is made to FIGS. 3, 7, and 8. FIG. 7 is a cross-sectional view showing a structure of the light emitting region 101 of the light emitting substrate 110 shown in FIG. 3, and FIG. 8 is a cross-sectional view showing a structure of the fan-out region 102 of the light emitting substrate 110 shown in FIG. 3. The light emitting substrate 110 (the plurality of signal lines 30) further includes a plurality of first voltage signal lines 15, a plurality of second voltage signal lines 16, a plurality of addressing signal lines 17, a plurality of addressing adapter lines 18, and a plurality of feedback signal lines 19.

At least one first voltage signal line 15 of the plurality of first voltage signal lines 15 extends substantially in the first direction Y, and in the second direction X, the first voltage signal lines 15 and the ground traces 13 are alternately arranged. A single first voltage signal line 15 corresponds to a single driver chip subset 201.

For example, each first voltage signal line 15 of the plurality of first voltage signal lines 15 extends substantially in the first direction Y. The description that a single first voltage signal line 15 corresponds to a single driver chip subset 201 means that, groups of light emitting devices 10 electrically connected to the plurality of driver chips 12 in the single driver chip subset 201 are electrically connected to the single first voltage signal line 15. The first voltage signal line 15 is configured to provide a positive voltage signal for light emitting devices 11 in the groups of light emitting devices 10.

For example, referring to FIG. 3, the first voltage signal lines 15 and the ground traces 13 are arranged in the same layer, the first voltage signal lines 15 and the ground traces 13 are arranged alternately in the second direction X, and the first voltage signal line 15 is located on a side of the ground trace 13 away from the driver chip subset 201.

The light emitting device 11 is further electrically connected to the signal output pin Do of the driver chip 12, and the signal output pin Do is configured to output a negative voltage signal to the light emitting device 11 and to output an addressing signal to a next stage driver chip 12. Through the driver chip 12, it may be possible to control whether a group of light emitting devices 10 electrically connected to the driver chip 12 emit light, and control the brightness of the light.

The plurality of first voltage signal lines 15 are made of the same material and disposed in the same layer as the plurality of ground traces 13. For example, referring to FIG. 7, the plurality of first voltage signal lines 15 and the plurality of ground traces 13 are made of copper and are all located in a first trace layer 22.

A single second voltage signal line 16 (e.g., a power supply voltage signal line) is electrically connected to the power pins PWR of the plurality of driver chips 12 in a single driver chip subset 201. The second voltage signal line 16 is configured to provide a power supply voltage signal to the driver chip 12. In the second direction X, the second voltage signal lines 16 and the ground traces 13 are alternately arranged.

In some embodiments, the second voltage signal lines 16 are made of the same material and disposed in the same layer as the ground traces 13. For example, referring to FIG. 7, the plurality of second voltage signal lines 16 and the plurality of ground traces 13 are made of copper and are all located in the first trace layer 22. Only one second voltage signal lines 16 and one ground trace 13 are shown in FIG. 7.

A single addressing signal line 17 is electrically connected to a first stage driver chip 12 of the driver chips 12 in a single driver chip set 20. The addressing signal line 17 is configured to provide an addressing signal (an ADDR signal) for the driver chips 12 in the driver chip set 20.

In two driver chips 12 that are cascaded, the signal output pin Do of a former stage driver chip 12 and the signal input pin Di of a latter stage driver chip 12 are electrically connected through an addressing adapter line 18.

A single feedback signal line 18 (also referred to as a return signal line FB) is electrically connected to a last stage driver chip 12 of the driver chips 12 in a single driver chip set 20. The feedback signal line 18 is configured to output the return signal of the driver chip set 20.

In some embodiments, in the light emitting region 101, the addressing signal line 17, the addressing adapter line 18, and the feedback signal line 19 are made of the same material and disposed in the same layer. For example, referring to FIG. 7, the addressing signal lines 17, the addressing adapter lines 18, and the feedback signal lines 19 are made of copper and are all located in a second trace layer 24. Herein, only the addressing adapter line 18 is illustratively shown in FIG. 7.

In the fan-out region 102 and the bonding region 103, the addressing signal lines 17 and the feedback signal lines 19 are located in the same layer, and are located in the first trace layer 22. In this way, it may be rather convenient to arrange the plurality of bonding pins of the plurality of signal lines 30 in the same film layer, which may facilitate the bonding connection between the bonding pins and other electronic components.

For example, referring to FIG. 8, FIG. 8 illustrates a cross-sectional view of the plurality of signal lines 30 in the fan-out region 102. In the fan-out region 102, the ground traces 13, the first voltage signal lines 15, the second voltage signal lines 16, the addressing signal lines 17 and the feedback signal lines 19 are located in the same layer, and all located in the first trace layer.

It will be noted that, the addressing adapter line 18 is used to electrically connect two driver chips 12 that are cascaded. Since driver chips 12 in the plurality of driver chip sets 20 are all disposed in the light emitting region 101, the addressing adapter lines 18 are only disposed in the light emitting region 101; alternatively, the addressing adapter lines 18 are partially disposed in the light emitting region 101 and partially disposed in a border of the fan-out region 102 proximate to the light emitting region 101.

Figure 9:
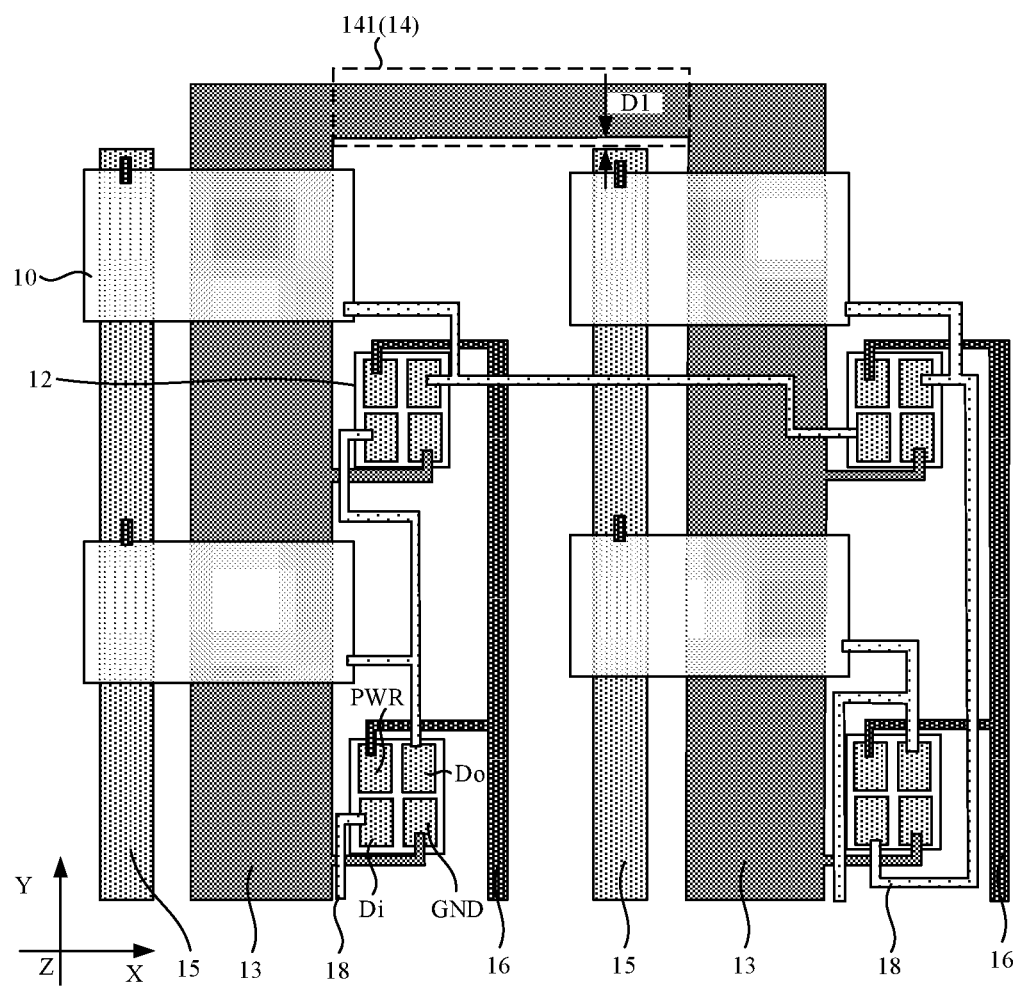
FIG. 9 is an enlarged partial view of the D region in FIG. 3.

In some embodiments, referring to FIGS. 3 and 9, FIG. 9 is a partial enlarged view of the D region of FIG. 3. An end of the ground trace 13 away from the fan-out region 102 (an upper end of the ground trace 13 in the first direction Y in FIG. 9) extends beyond an end of the first voltage signal line 15 away from the fan-out region 102 (an upper end of the first voltage signal line 15 in the first direction Y in FIG. 9).

The one or more connection lines 14 include a first connection line 141 located on a side of the first voltage signal line 15 away from the fan-out region 102, and the first connection line 141 is electrically connected to the end of the ground trace 13 away from the fan-out region 102. As such, the first connection line 141 may avoid other signal lines (e.g., the first voltage signal line 15, the second voltage signal line 16, and the addressing adapter line 18) and will not affect the arrangement of the other signal lines. Therefore, there's no need to adjust the manufacturing process of the other signal lines, and the signal interference between the first connection line 141 and the other signal lines may be reduced.

In some embodiments, the first connection lines 141 and the ground traces 13 are made of the same material and disposed in the same layer. In this way, the first connection lines 141 may be formed using the manufacturing process of the ground traces 13, and there's no need to add an additional step to the manufacturing process of the light emitting substrate 110. As a result, the manufacturing difficulty and manufacturing cost of the light emitting substrate 110 may be reduced.

A distance D1 exists between the first connection line 141 and the end of the first voltage signal line 15 away from the fan-out region 102, which may prevent a short circuit between the first connection line 141 and the first voltage signal line 15.

In some embodiments, the distance D1 between the first connection line 141 and the end of the first voltage signal line 15 away from the fan-out region 102 is greater than or equal to 200 μm. As such, it may be possible to reduce the signal interference caused by the first connection line 14 to the first voltage signal line 15. For example, the distance D1 may be 200 μm, 250 μm, 300 μm, etc., which are not all listed in the embodiments of the present disclosure.

It will be understood that, in a case where the operating voltage of the first voltage signal line 15 is large, the distance D1 may be increased, and the specific value of the distance D1 may be set according to actual needs.

Figure 10:
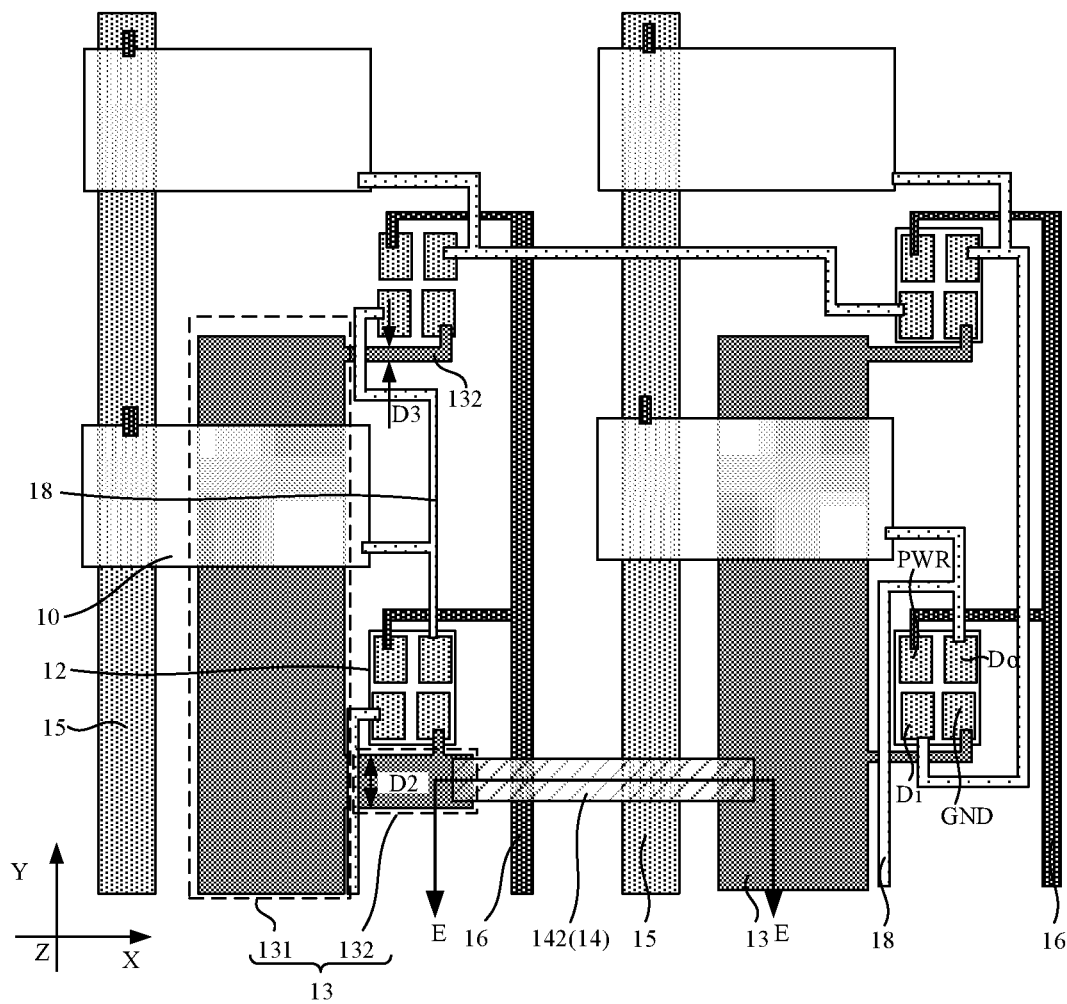
FIG. 10 is a structural diagram of a second connection line, in accordance with some embodiments.
Figure 11:
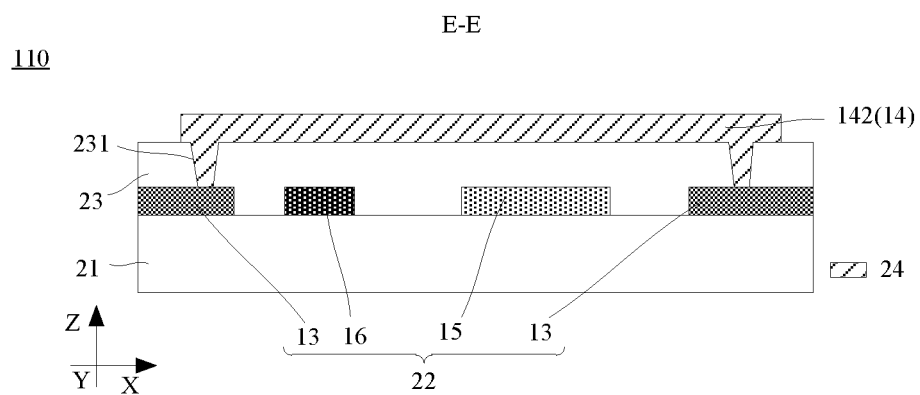
FIG. 11 is a cross-sectional view taken along a section line E-E in FIG. 10.

In some embodiments, referring to FIGS. 10 and 11, FIG. 10 is a structural diagram of the connection line 14 (a second connection line 142) in a case where it is disposed in the light emitting region 101. The light emitting substrate 110 includes a substrate 21, the first trace layer 22 disposed on the substrate 21, a first insulating layer 23 disposed on a side of the first trace layer 21 away from the substrate 21, and the second trace layer 24 disposed on a side of the first insulating layer 23 away from the substrate 21. The first insulating layer 23 is provided with a plurality of first via holes 231 therein.

The one or more connection lines 14 include the second connection line 142 located in the second trace layer 24. An orthographic projection of the second connection line 142 on the first insulating layer 23 partially overlaps with an orthographic projection of the first voltage signal line 15 on the first insulating layer 23. The second connection line 142 is electrically connected to the ground trace 13 through the first via hole 231. The second connection line 142 is disposed in the light emitting region 101, which may help reduce the width of the non-light emitting region (on the side of the light emitting region 101 away from the fan-out region), reduce the bezel width of the light emitting substrate 110, and thus reduce the bezel width of the display device 1000. The second connection line 142 is disposed in the second trace layer 24, which may avoid a short circuit between the second connection line 142 and both the first voltage signal line 15 and the second voltage signal line 16, thereby improving the reliability of the light emitting substrate 110.

For example, the driver chip set 20 includes two driver chip subsets 201, and the plurality of driver chips 12 in each driver chip subset are electrically connected to a ground trace 13. The second connection lines 142 are electrically connected to the two ground traces 13 through respective first via holes 231.

For example, the two ground traces 13 may be electrically connected through one, two, or more second connection lines 142.

For example, in a case where the driver chip set 20 includes three or more driver chip subsets 201, it may be arranged that any two adjacent two ground traces 13 are electrically connected through at least one second connection line 142. Alternatively, it may also be arranged that any adjacent multiple ground traces 13 are electrically connected through at least one second connection line 142.

In some embodiments, referring to FIG. 10, the ground trace 13 includes a main body portion 131 and connecting portions 132. The main body portion 131 extends in the first direction Y, and the connecting portions 132 are each configured to electrically connect the main body portion 131 to the driver chip 12. For example, one end of the connecting portion 132 is electrically connected to the body portion 131, and another end thereof is electrically connected to the ground pin GND of the driver chip 12.

The second connection line 142 is electrically connected to the connecting portion 132 through the first via hole 231, and a width D2 of a connecting portion 132 electrically connected to the second connection line 142 is greater than a width D3 of another connecting portion 132 not electrically connected to the second connection line 142. By increasing the width of the connecting portion 132 electrically connected to the second connection line 142, it may be possible to reduce the risk of an excessive current on the second connection line 142 damaging the connecting portion 132 electrically connected to the second connection line 142, improve the anti-static capacity of the light emitting substrate 110, and thus improve the reliability of the light emitting substrate 110.

Figure 12:
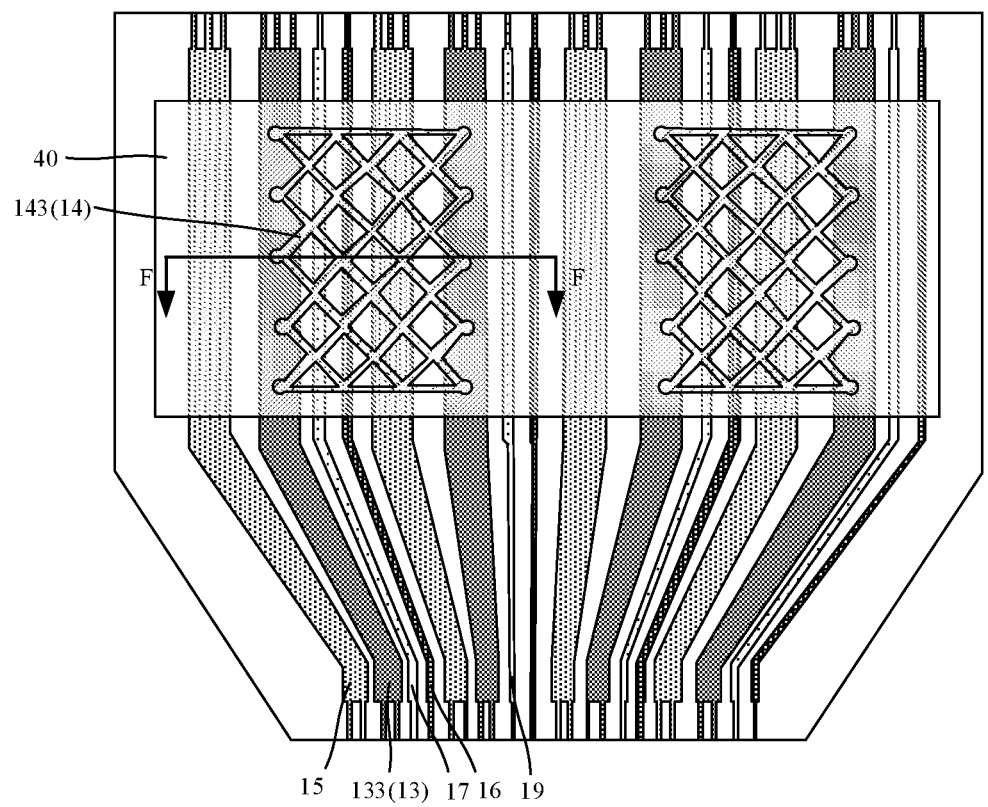
FIG. 12 is a structural diagram of a third connection line, in accordance with some embodiments.
Figure 13:
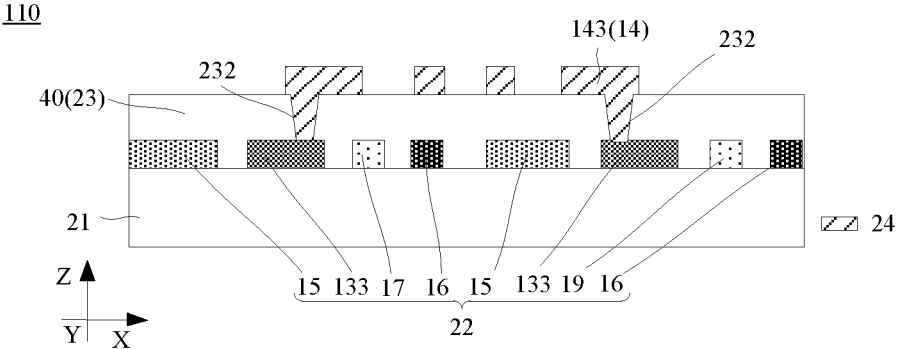
FIG. 13 is a cross-sectional view taken along a section line F-F in FIG. 12.

In some embodiments, referring to FIGS. 12 and 13, the ground trace 13 includes a first lead-out section 133 located in the fan-out region 102, and the first lead-out section 133 is located in the first trace layer 22.

The light emitting substrate 110 further includes an insulating pattern 40, which is located in the fan-out region 102 and covers at least a portion of the first lead-out section 133. The one or more connection lines 14 include a third connection line 143 located in the fan-out region 102. The third connection line 143 is located on a side of the insulating pattern 40 away from the substrate 21, and the third connection line 143 is electrically connected to the first lead-out section 133 through the second via hole 41.

Since there are many light emitting devices 11, driver chips 12, and the plurality of signal lines 30 in the light emitting region 101, there's only limited space for arranging the signal lines. Therefore, the third connection line(s) 143 are disposed in the fan-out region 102, which may reduce the influence of the third connection line(s) 143 on the plurality of signal lines 30 in the light emitting region 101. Moreover, there would be a large space for arranging the third connection line(s) 143 without affecting the arrangement of other signal lines 30.

In some embodiments, referring to FIG. 12, the third connection line 143 is of a grid-like structure. With such design, it may be possible to reduce the signal interference generated by the third connection line 143 on other signal lines 30 without reducing the resistance of the third connection line 143, and thereby improve the reliability of the light emitting substrate 110.

In some embodiments, the insulating pattern 40 is located in the first insulating layer 23, and the third connection line 143 is located in the second trace layer 24. In this way, the insulating pattern 40 and the third connection line 143 may be formed using existing film forming processes, respectively, which may simplify the manufacturing process of the light emitting substrate 110 and reduce the manufacturing cost of the light emitting substrate 110.

It will be noted that the insulating pattern 40 may also be formed after the second trace layer 24 is formed, i.e., the insulating pattern 40 and the first insulating layer 23 are formed by two film forming processes (e.g., coating, exposure, developing and etching, and other processes). In this case, the third connection line 143 and the second trace layer 24 are also formed by two film forming processes.

Based on the above descriptions, in the backlight module provided by the embodiments of the present disclosure, due to the adoption of the aforementioned light emitting substrate, the reliability of the backlight module may be improved.

In addition, the display device provided by the embodiments of the present disclosure may achieving the same beneficial effects as the aforementioned light emitting substrate, and details will not be repeated here.

The foregoing descriptions are merely some specific implementation manners of the present disclosure, but the protection scope of the present disclosure is not limited thereto. Any person skilled in the art could conceive of changes or replacements within the technical scope disclosed by the present disclosure, which shall all be included in the protection scope of the present disclosure. Therefore, the protection scope of the present disclosure shall be subject to the protection scope of the claims.

What is claimed is:

1. A light emitting substrate, comprising:
   a plurality of driver chip sets, at least one driver chip set including a plurality of driver chip subsets, at least one driver chip subset including a plurality of driver chips that are cascaded, each driver chip including a signal input pin, a signal output pin, a ground pin, and a power pin, and driver chip subsets in a same driver chip set being cascaded;
   a plurality of ground traces, driver chips in a same driver chip subset being electrically connected to a same ground trace, and different driver chip subsets being respectively connected to different ground traces;
   one or more connection lines, ground traces respectively connected to the driver chip subsets in the same driver chip set being electrically connected by at least one connection line;
   a plurality of groups of light emitting devices, at least one group of light emitting devices including a plurality of light emitting devices, and light emitting devices in a same group of light emitting devices being electrically connected to a signal output pin of a same driver chip;
   a plurality of first voltage signal lines, groups of light-emitting devices electrically connected to the driver chips in the driver chip subset being electrically connected to a first voltage signal line;
   a plurality of second voltage signal lines, a second voltage signal line being electrically connected to power pins of the driver chips in the driver chip subset;
   a plurality of addressing signal lines, an addressing signal line being electrically connected to a first stage driver chip of driver chips in a driver chip set;
   a plurality of addressing adapter lines, in two driver chips that are cascaded, a signal output pin of a former stage driver chip being electrically connected to a signal input pin of a latter stage driver chip through an addressing adapter line; and
   a plurality of feedback signal lines, a feedback signal line being electrically connected to a last stage driver chip of the driver chips in the driver chip set.

2. A light emitting substrate, comprising:
   a plurality of driver chip sets, at least one driver chip set including a plurality of driver chip subsets, at least one driver chip subset including a plurality of driver chips that are cascaded, and driver chip subsets in a same driver chip set being cascaded;
   a plurality of ground traces, driver chips in a same driver chip subset being electrically connected to a same ground trace, and different driver chip subsets being respectively connected to different ground traces;
   one or more connection lines, ground traces respectively connected to the driver chip subsets in the same driver chip set being electrically connected by at least one connection line; and
   a plurality of first voltage signal lines, at least one first voltage signal line extending substantially in a first direction, and the plurality of first voltage signal lines and the plurality of ground traces being arranged alternately in a second direction; a first voltage signal line corresponding to a driver chip subset; the plurality of first voltage signal lines being made of a same material and disposed in a same layer as the plurality of ground traces, and the first direction intersecting the second direction, wherein the light emitting substrate has a light emitting region and a fan-out region that are arranged side by side in the first direction, and the plurality of driver chip sets are located in the light emitting region;

an end of a ground trace away from the fan-out region extends beyond an end of the first voltage signal line away from the fan-out region;

the one or more connection lines include a first connection line located on a side of the first voltage signal line away from the fan-out region, and the first connection line is electrically connected to the end of the ground trace away from the fan-out region.

3. The light emitting substrate according to claim 2, wherein the first connection line is made of a same material and disposed in a same layer as the plurality of ground traces, and the first connection line and the end of the first voltage signal line away from the fan-out region have a distance therebetween.

4. The light emitting substrate according to claim 3, wherein the distance between the first connection line and the end of the first voltage signal line away from the fan-out region is greater than or equal to 200 μm.

5. A light emitting substrate, comprising:
a plurality of driver chip sets, at least one driver chip set including a plurality of driver chip subsets, at least one driver chip subset including a plurality of driver chips that are cascaded, and driver chip subsets in a same driver chip set being cascaded;
a plurality of ground traces, driver chips in a same driver chip subset being electrically connected to a same ground trace, and different driver chip subsets being respectively connected to different ground traces;
one or more connection lines, ground traces respectively connected to the driver chip subsets in the same driver chip set being electrically connected by at least one connection line; and
a plurality of first voltage signal lines, at least one first voltage signal line extending substantially in a first direction, and the plurality of first voltage signal lines and the plurality of ground traces being arranged alternately in a second direction; a first voltage signal line corresponding to a driver chip subset, and the first direction intersecting the second direction, wherein
the light emitting substrate comprises a substrate, a first trace layer, a first insulating layer and a second trace layer that are stacked in sequence; the plurality of ground traces and the plurality of first voltage signal lines are located in the first trace layer, and the first insulating layer is provided with a first via hole therein;
the one or more connection lines include a second connection line located in the second trace layer, an orthographic projection of the second connection line on the first insulating layer partially overlaps with an orthographic projection of the first voltage signal line on the first insulating layer, and the second connection line is electrically connected to a ground trace through the first via hole.

6. The light emitting substrate according to claim 5, wherein the light emitting substrate has a light emitting region and a fan-out region that are arranged side by side in the first direction, and the plurality of driver chip sets are located in the light emitting region;

the ground trace includes a main body portion and connecting portions, the main body portion extends in the first direction, and the connecting portions each electrically connect the main body portion to a driver chip;

the second connection line is electrically connected to a connecting portion through the first via hole, and a width of the connecting portion electrically connected to the second connection line is greater than a width of another connecting portion not electrically connected to the second connection line.

7. The light emitting substrate according to claim 1, wherein the light emitting substrate has a light emitting region and a fan-out region that are arranged side by side in a first direction, and the plurality of driver chip sets are located in the light emitting region;

the light emitting substrate comprises a substrate, a first trace layer disposed on the substrate, and an insulating pattern disposed on a side of the first trace layer away from the substrate; the insulating pattern is provided with a second via hole therein;

a ground trace includes a first lead-out section located in the fan-out region, and the first lead-out section is located in the first trace layer;

the one or more connection lines include a third connection line located in the fan-out region, the third connection line is located on a side of the insulating pattern away from the substrate, and the third connection line is electrically connected to the first lead-out section through the second via hole.

8. The light emitting substrate according to claim 7, wherein the third connection line is of a grid-like structure.

9. The light emitting substrate according to claim 7, further comprising a first insulating layer disposed on the side of the first trace layer away from the substrate, and a second trace layer disposed on a side of the first insulating layer away from the substrate, wherein
the insulating pattern is located in the first insulating layer, and the third connection line is located in the second trace layer.

10. The light emitting substrate according to claim 1, wherein
the plurality of driver chips in the driver chip subset are arranged substantially in a first direction, the plurality of driver chip subsets in the driver chip set are arranged substantially in a second direction, and the plurality of driver chip sets are arranged substantially in the second direction, the first direction intersects the second direction;
the plurality of ground traces extend substantially in the first direction, and the plurality of ground traces and all driver chip subsets are arranged alternately in the second direction, and the driver chips in the driver chip subset are electrically connected to an adjacent ground trace.

11. The light emitting substrate according to claim 10, wherein in any two adjacent driver chip subsets in the same driver chip set, a last stage driver chip in one driver chip subset is electrically connected to a first stage driver chip in another driver chip subset.

12. A backlight module, comprising the light emitting substrate according to claim 1.

13. A display device, comprising:
a display panel; and
the backlight module according to claim 12 disposed on a backlight surface of the display panel.

14. The light emitting substrate according to claim 1, wherein the plurality of second voltage signal lines are made of a same material and disposed in a same layer as the plurality of ground traces.

15. The light emitting substrate according to claim 1, wherein the light emitting substrate has a light emitting region and a fan-out region that are arranged side by side in a first direction; in the light emitting region, the plurality of addressing signal lines, the plurality of addressing adapter lines and the plurality of feedback signal lines are made of a same material and disposed in a same layer.

16. The light emitting substrate according to claim 15, wherein the light emitting substrate further has a bonding region located on a side of the fan-out region away from the light emitting region; in the fan-out region and the bonding region, the plurality of addressing signal lines and the plurality of feedback signal lines are located in a same layer as the plurality of ground traces.

17. The light emitting substrate according to claim 16, wherein the light emitting substrate comprises a substrate, a first trace layer, a first insulating layer and a second trace layer that are stacked in sequence;

the plurality of addressing signal lines and the plurality of feedback signal lines are located in the second trace layer in the light emitting region, and are located in the first trace layer in the fan-out region and the bonding region.

\* \* \* \* \*